United States Patent
Rolfe et al.

[11] Patent Number: 5,892,610
[45] Date of Patent: Apr. 6, 1999

[54] SCANNING SYSTEM WITH ERROR-CORRECTING DEFLECTOR

[75] Inventors: Norman F. Rolfe, Carlisle; David B. Larsen, Woburn, both of Mass.

[73] Assignee: Agfa Division—Bayer Corporation, Wilmington, Mass.

[21] Appl. No.: 890,831

[22] Filed: Jul. 10, 1997

[51] Int. Cl.[6] .................................................. G02B 26/08
[52] U.S. Cl. ........................ 359/198; 359/204; 359/212; 359/223; 359/226
[58] Field of Search ..................... 359/196, 197, 359/201–204, 209–212, 226, 831, 833, 834, 837; 347/233, 241–244, 256–260; 358/474, 493

[56] References Cited

U.S. PATENT DOCUMENTS

| | | |
|---|---|---|
| 4,782,474 | 11/1988 | Arai et al. . |
| 4,969,137 | 11/1990 | Sugiyama et al. . |
| 5,026,133 | 6/1991 | Roddy et al. ........................... 359/211 |
| 5,097,351 | 3/1992 | Kramer . |
| 5,179,463 | 1/1993 | Kramer . |
| 5,214,528 | 5/1993 | Akanabe et al. . |
| 5,253,245 | 10/1993 | Rabedeau . |
| 5,309,274 | 5/1994 | Akanabe . |
| 5,311,321 | 5/1994 | Crowley . |
| 5,412,501 | 5/1995 | Fisli . |
| 5,502,709 | 3/1996 | Shinada . |
| 5,523,811 | 6/1996 | Wada et al. . |
| 5,637,861 | 6/1997 | Okada et al. . |

FOREIGN PATENT DOCUMENTS

| | | |
|---|---|---|
| 0 475 399 | 3/1992 | European Pat. Off. . |
| 0 557 998 | 9/1993 | European Pat. Off. . |
| 0 632 434 | 2/1995 | European Pat. Off. . |

*Primary Examiner*—James Phan
*Attorney, Agent, or Firm*—Edward L. Kelley; Charles B. Katz

[57] ABSTRACT

A system for scanning a surface includes a radiation emitter configured to emit at least one beam of radiation, and a rotating deflector for deflecting the beam(s) onto a scanning surface. The deflector is movable along a translation axis to modify the path of the deflected beam(s) and thereby correct for any mispositioning of the beam(s) with respect to the scanning surface.

22 Claims, 4 Drawing Sheets

SCANNING SYSTEM WITH ERROR-CORRECTING DEFLECTOR

TECHNICAL FIELD

The present invention relates to scanning systems, and more particularly to scanning systems including a deflector which is movable along a translation axis to correct for beam positioning errors.

BACKGROUND ART

Modern electronic prepress operations utilize laser scanning systems to write or record images for subsequent reproduction or to scan a prerecorded image at a predefined resolution rate. Such scanning systems may write or record images or scan prerecorded images on various prepress media including, photo or thermal sensitive paper or polymer films, photo or thermal sensitive coatings or erasable imaging materials mounted onto an image recording surface or photo or thermal sensitive paper, polymer film or aluminum base printing plate materials, all used in electronic image reproduction. Such media are mounted onto a recording surface which may be planar but which is more typically curved and scanned with a recording or scanning beam or beams. The primary components of such a system include a recording surface, usually a drum cylinder and a scan mechanism disposed and movable within the drum cylinder or drum movable relative to scan mechanism. The system also includes a processor, with an associated storage device, for controlling the scanning mechanism and for scanning a prerecorded image, a photodetector and detector processor. The processor and associated storage device may be housed within the system itself or separate from the system with appropriate interconnection to the system.

The processor, in accordance with stored programming instructions, controls the scanning mechanism to write or read images on the plate or other medium mounted to the inner drum cylinder wall by scanning one or more optical beams over the inside circumference of the drum cylinder while the drum cylinder itself remains fixed.

The scanning and hence the recording are performed over only a portion of the cylinder inner circumference, typically between 120 and 320 of the circumference of the drum cylinder. The optical beam(s) are typically emitted so as to be parallel with a central axis of the cylinder and are deflected, by for example, a spinning mirror, Hologon or Penta-prism deflector so as to form a single scan line or multiple scan lines which simultaneously impinge upon the recording surface. The deflector is spun or rotated by a motor about an axis of rotation substantially coincident with the central axis of the drum cylinder. To increase the recording speed, the speed of rotation of the beam deflecting device can be increased. To even further increase the recording speed, multiple beam scanning has been previously proposed.

One such proposed multiple beam scanner has utilized a spinning dove prism with a single light source, as discussed, for example, in U.S. Pat. No. 5,214,528. Using a dove prism beneficially allows the use of a multiple beam source, e.g. a laser diode array, while eliminating the need for multiple beam correction elements and associated hardware. Additionally, for reasons which need not be discussed here, the scan speed of multiple beam systems using a dove prism can exceed that of other types of proposed multi-beam systems.

In a typical multibeam scanning system, a dove prism is disposed in the optical path between the beam source and the deflector. The prism is caused to rotate about an axis coincident with the rotational axis of the deflector (or an optical axis which becomes coincident therewith) at half the rotational speed of the deflector. Since the rotation of the dove prism produces a 2x axial rotation of all light beams passing through the prism, the multiple beams leaving the prism will rotate in lock step with the rotation of the deflector. Accordingly, by passing the multiple light beams through a spinning dove prism, crossing of the multiple scan lines formed by the spin mirror is avoided. For a more detailed description of the operation of a dove prism with respect to a multibeam scanning system, reference may be made to U.S. Pat. No. 5,214,528.

In scanning systems of the foregoing description, beam positioning errors adversely affecting image quality will result if the rotation axes of the dove prism (or similar beam rotation element) and of the deflector are not perfectly aligned. Misalignment of the dove prism and deflector rotational axes may be caused by, for example, a wobble or other dynamic anomaly associated with the dove prism shaft and/or deflector shaft, or an error in mounting the dove prism and deflector relative to one another. Rather than forming straight scan lines on the scanning surface, a scanning system having a misalignment will produce scan lines that are bowed or have an otherwise curved aspect. Curving or bowing of the scan lines, in the aggregate, may substantially compromise the quality of the scanned image.

Furthermore, because the prism rotates at half the rotational speed of the deflector, beam misalignment arising from a wobble or other dynamic anomaly, can cause a twinning effect between groups of multiple beams. If the twinning effect is excessive, the system will be restricted to scanning only every other rotation of the deflector to avoid twinning and thereby obtain scans of acceptable quality. Thus, a two beam system would have an effective scanning rate equal to that of a single beam system, a four beam system will have an effective scan rate only twice as fast as a single beam system, and so on.

It is possible to reduce the aforementioned beam positioning errors through various techniques, such as utilizing tight mechanical tolerances with respect to mounting of the dove prism and deflector, or by increasing the ratio of the beam diameter at the dove prism to the diameter at the deflector. However, these techniques are generally insufficient to completely eliminate beam mispositioning with respect to the scanning surface, and imaging artifacts will continue to be present even if such techniques are employed.

U.S. Pat. No. 5,097,351 discloses a multibeam system which employs a controlled movable reflector in place of a dove prism, and requires that each of two beams follow a separate optical path, each path having separate focussing and collimating optics and acousto-optic modulators. The controlled reflector is positioned in only one of the optical paths and is driven to rotate the beam in synchrony with the rotation of the spin deflector. Beam positioning errors, detected by a quadrature photodetector array, are corrected by driving the reflector to adjust angular alignment during scanning operations. However, the complexity of the foregoing system makes practical implementation thereof a difficult proposition.

OBJECTS OF THE INVENTION

In accordance with the foregoing discussion, it is a general object of the invention to provide a scanning system including a simplified mechanism for correcting beam positioning errors and eliminating or minimizing scanning or imaging artifacts arising therefrom. It is a more specific object of the invention to provide a scanning system including a mechanism for collecting a known periodic beam positioning error which may operate without the need to continuously monitor or detect the beam position. It is another object of the invention to provide a scanning system construction which constrains misalignment errors to a range correctable by a simplified error correcting mechanism.

Additional objects, advantages, novel features of the present invention will become apparent to those skilled in the art from this disclosure, including the following detailed description, as well as by practice of the invention. While the invention is described below with reference to preferred embodiments for electronic prepress applications, it should be understood that the invention is not limited thereto. Those of ordinary skill in the art having access to the teachings herein will recognize additional applications, modifications, and embodiments in other fields, which are within the scope of the invention as disclosed and claimed herein and with respect to which the invention could be of significant utility.

SUMMARY OF THE INVENTION

In accordance with the present invention, a scanning system and technique are provided which are particularly suitable for implementation in high quality graphic arts image setters, platemakers or scanners. The scanning system includes at least one laser or other type of radiation emitter or emitter array which emits one or more beams directed towards a rotating deflector configured to deflect and scan the beam or beams onto a scanning surface to record or write or scan the image. The deflector is preferably mirror-based, but may alternatively comprise a Hologon, prism or other type of reflective surface known in the art. In embodiments of the present invention utilizing multiple beams to effect high-speed scanning, a beam rotation element, typically a rotating dove prism, is interposed between the beam emitter and deflector to rotate the beams about a central optical axis and thereby maintain a constant separation between adjacent scan lines.

To correct for positioning errors of the beam(s) with respect to the scanning surface, the axial position of the deflector is adjusted by moving the deflector shaft along a translation axis parallel to and preferably coincident with the axis of rotation. The repositioning of the deflector results in a displacement in the path of the deflected beam(s) by an amount necessary to compensate for the misalignment-related beam error.

The means for translating the deflector may comprise a linear motor including a permanent magnet affixed to the deflector shaft, and a linear motion stator coil to which an electrical current is applied by control means in accordance with the desired axial movement of the deflector. By translating the deflector in synchronization with the rotation of the deflector and beam rotation element, beam positioning errors arising from misalignment of the beam rotation element and deflector and from wobble of the beam rotation element and/or deflector shafts may be corrected.

In a preferred implementation of the scanning system, measurement of beam positioning error is performed during the manufacturing and testing process, i.e., prior to operation of the system by the end-user. By characterizing the beam positioning error with respect to the scanning surface as a function of beam rotation element (i.e., dove prism) rotation angle, the translational movement of the deflector necessary to compensate for the measured beam mispositioning may be encoded and stored in the linear motor control means. Accordingly, the control means will drive the translational movement of the deflector during scanning operations such that beam positioning errors are corrected. This technique obviates the need to incorporate into the scanning system a detector for continuous measurement of beam position.

It will be appreciated that the foregoing technique assumes that the beam positioning error of an individual scanning system may be simply characterized as a periodic function of the dove prism rotation angle. If substantial changes in the beam positioning error are anticipated over the operational lifetime of a scanning system, due to, for example, degradation of dove prism and/or deflector motor performance, it may be beneficial to include in the scanning system a detector to continuously or periodically detect beam positioning error. Linear motor control means interconnected with the detector may drive the translational movement of the deflector in accordance with the detected beam position to correct for any beam positioning errors.

In accordance with further aspects of the invention, a novel construction is provided for a multi-beam scanning system which minimizes beam positioning errors, particularly those resulting from misalignment of the beam rotation element relative to the deflector. The construction makes use of a unitary housing, which mounts and locates all of the key components of the scanning system, including the beam rotation element, collimating and focussing optics, and the deflector. By utilizing a single housing, the axes of the beam rotation element and deflector are made substantially coincident, as the bores in which both elements are mounted may be machined simultaneously. To further minimize beam positioning errors, the mounting surface for the beam emitter may be machined simultaneously with the beam rotation element and deflector mounts.

While the foregoing construction does not eliminate in their entirety beam positioning errors arising from misalignment of the beam rotation element and deflector, the beam positioning errors are thereby constrained to a range which may be readily compensated for by the translation or offsetting of the deflector.

DESCRIPTION OF PREFERRED EMBODIMENTS

Figure 1:
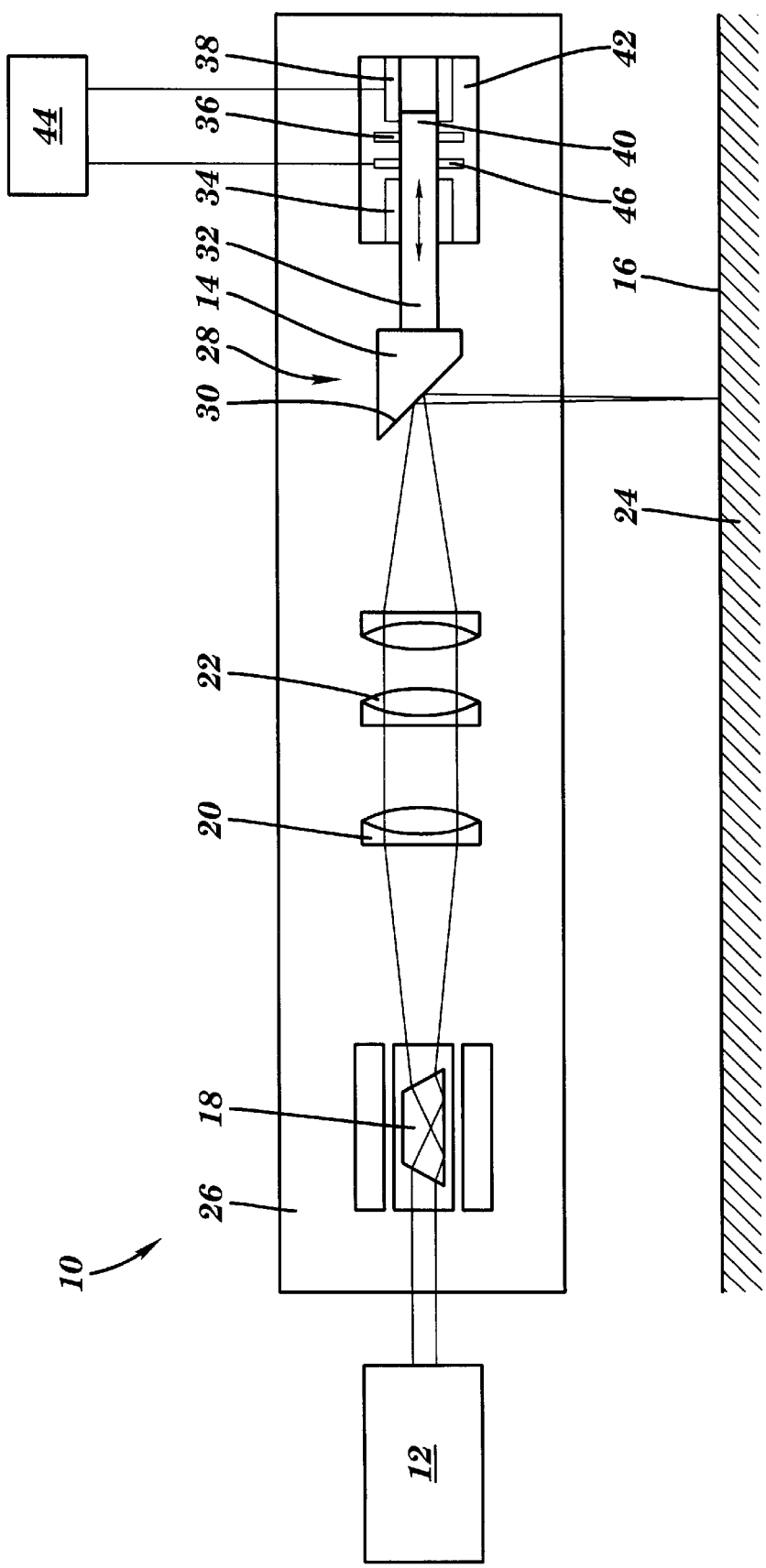
FIG. 1 schematically depicts a first embodiment of a scanning system with a translating deflector according to the present invention.

FIG. 1 shows a scanning system 10 in accordance with a first embodiment of the invention. The scanning system includes a beam emitter 12 configured to emit a plurality of beams of radiation directed towards deflector 14, which deflects the beams onto scanning surface 16. It is to be understood that although the preferred embodiments are described and depicted in terms of a two-beam system, systems utilizing additional beams may be realized without departing from the scope of the present invention.

A beam rotation element, preferably comprising a rotating dove prism 18, is interposed between the beam emitter 12 and deflector 14. The dove prism 18 operates to rotate the two beams about a beam rotation axis in synchrony with the rotation of deflector 14 such that the scan lines produced on scanning surface 16 have a constant separation and are non-intersecting. Typically, a first of the two beams will be directed along a path substantially coincident with the axis of rotation of the dove prism 18 (the beam rotation axis). A second of the two beams is directed along a path substantially parallel to, but spaced from, the beam rotation axis, and is rotated thereabout by the dove prism 18. The beam rotation axis is substantially coincident with the rotational axis of the deflector 14. By rotating the dove prism 18 at half the rotational speed of the deflector 14, the beams leaving the dove prism 18 are caused to rotate in lock step with the rotation of the deflector 14.

The beams leaving the dove prism 18 pass through collimating optics 20 and focusing optics 22 and are thereafter deflected by deflector 14 to form scan lines on scanning surface 16. The scanning surface 16 is beneficially positioned internally of a cylindrical drum 24 having a central longitudinal axis nominally coincident with the rotation axis of the deflector 14. The deflector 14, collimating and focusing optics 22 and 24, and, preferably, the dove prism 18 are mounted to carriage assembly 26 which is configured to move along the longitudinal axis of the drum 24 during scanning operations.

Under ideal conditions, the two beams impinge on the deflector 18 at the same respective locations throughout the rotation of the deflector. In this manner, scan lines are formed on the scanning surface 16 which are straight and mutually parallel. However, if any beam positioning errors are present, the beams will tend to "walk" on the deflector, producing bowed or wavy scan lines which may substantially degrade the quality of the scanned image. Beam positioning errors are generally attributable to misalignment of the dove prism 18 and deflector 14 associated with mechanical mounting tolerances, or to a rotational wobble of the dove prism and/or deflector.

To correct for beam positioning errors, the deflector 14 is provided with the added feature of translation or linear movement along a translation axis (indicated by an arrow in FIG. 1). As will be discussed in further detail hereinbelow, the controlled translation of the deflector modifies the paths of the deflected beams such that beam positioning errors may be compensated for, and undesirable curving or bowing of scan lines may thus be avoided.

Figure 2:
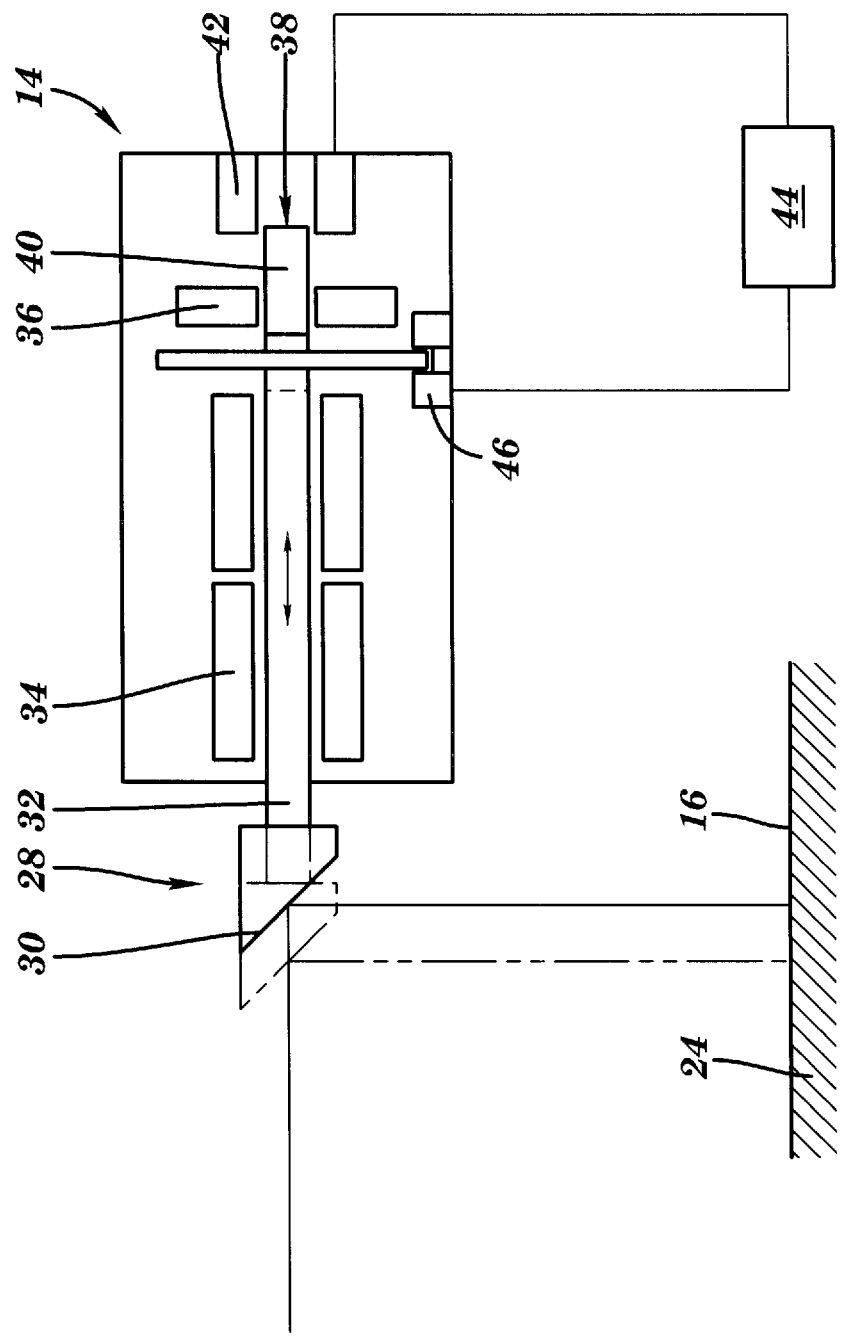
FIG. 2 schematically depicts details of the translating deflector, showing in particular the operation thereof to adjust the deflected beam path.

Referring to FIG. 2, an exemplary construction of the translating deflector 14 is shown.

The deflector 14 comprises a head 28 including mirror 30 for deflecting incident beams along deflected optical paths onto scanning surface 16. It is noted that although reference is made herein to a mirror-based deflector, other types of deflectors commonly employed in scanning systems, such as Hologon or prism based deflectors, are considered to be within the scope of the present invention.

Deflector head 28 is mounted to or formed integrally with shaft 32, which is advantageously of hollow construction in order to minimize the deflector's rotational and translational inertia. The shaft is supported for rotation about a rotation axis by an air bearing 34. A direct-current rotational motor 36, of a type well known in the art, is provided to effect rotation of the deflector 14. Translation of the deflector may be achieved by the use of a linear motor 38, comprising permanent magnet 40 and linear motion stator coil 42 to which a current is applied in accordance with the desired translational movement of the deflector. Linear motor control means 44 drives the linear motor 38 in synchrony with the rotational movement of the deflector 14 (as detected by optical rotary encoder 46) such that the deflector 14 is positioned to correct any misalignment of the beams with respect to the scanning surface 16. It is noted that the detector translational axis is nominally coincident with the rotational axis.

As may be seen by reference to FIG. 2, the deflected path(s) of the beam or beams incident on the deflector 14 is determined by the axial position of the deflector. Thus, by translating the deflector 14 via operation of the linear motor 38, the locations at which the deflected beams impinge on the scanning surface 16 can be adjusted. In FIG. 2, the translation of detector 14 from a first position to a second position (represented in dotted lines) produces a corresponding displacement in the deflected path of an incident beam. It will be understood that although the effect of the translation of the deflector is depicted with respect to a single beam, translation of the deflector in a multibeam system will result in substantially equal displacements with respect to each beam. It is further appreciated that translation of the deflector does not affect the relative spacing between multiple beams.

During scanning operations, the linear motor 38 is driven by linear motor control means 44 in accordance with the mispositioning of the beam(s) such that at any point during the rotation of the deflector 14 the mispositioning of the beam(s) is compensated by the appropriate axial repositioning of the deflector. It is noted that beam positioning errors in a scanning system arising from physical misalignment of the optical components, or from dynamic anomalies associated with rotation of the dove prism 18 and/or deflector 14, will repeat with each rotation of the dove prism 18. Thus, it is possible to characterize the mispositioning of the beam(s) with respect to the scanning surface 16 as a function of dove prism rotation angle. Beam positioning error data may be beneficially obtained during the manufacturing and testing process, i.e., following assembly of an individual scanning system but prior to its use by the end-user for scanning operation. The beam positioning error data may be obtained, for example, by imaging a reference pattern with the deflector maintained in the "rest" (untranslated) position, and measuring any divergence in the image thus produced from the desired pattern. In this manner, the axial movement of the deflector required to compensate for beam mispositioning may be encoded and permanently stored in the linear motor control means prior to operation of the scanning system.

It will be understood that the foregoing technique assumes that the beam positioning error data, i.e., the beam misalignment as a function of dove prism rotation angle, will be a substantially invariant characteristic of an individual scanning system. If substantial changes in beam positioning behavior are anticipated over time, due to, for example, degradation of dove prism and/or deflector motor performance, it may be advantageous to incorporate into the scanning system a detection system suitable for detecting a misalignment of one or more of the beams with respect to the deflector or other reference position.

Figure 3:
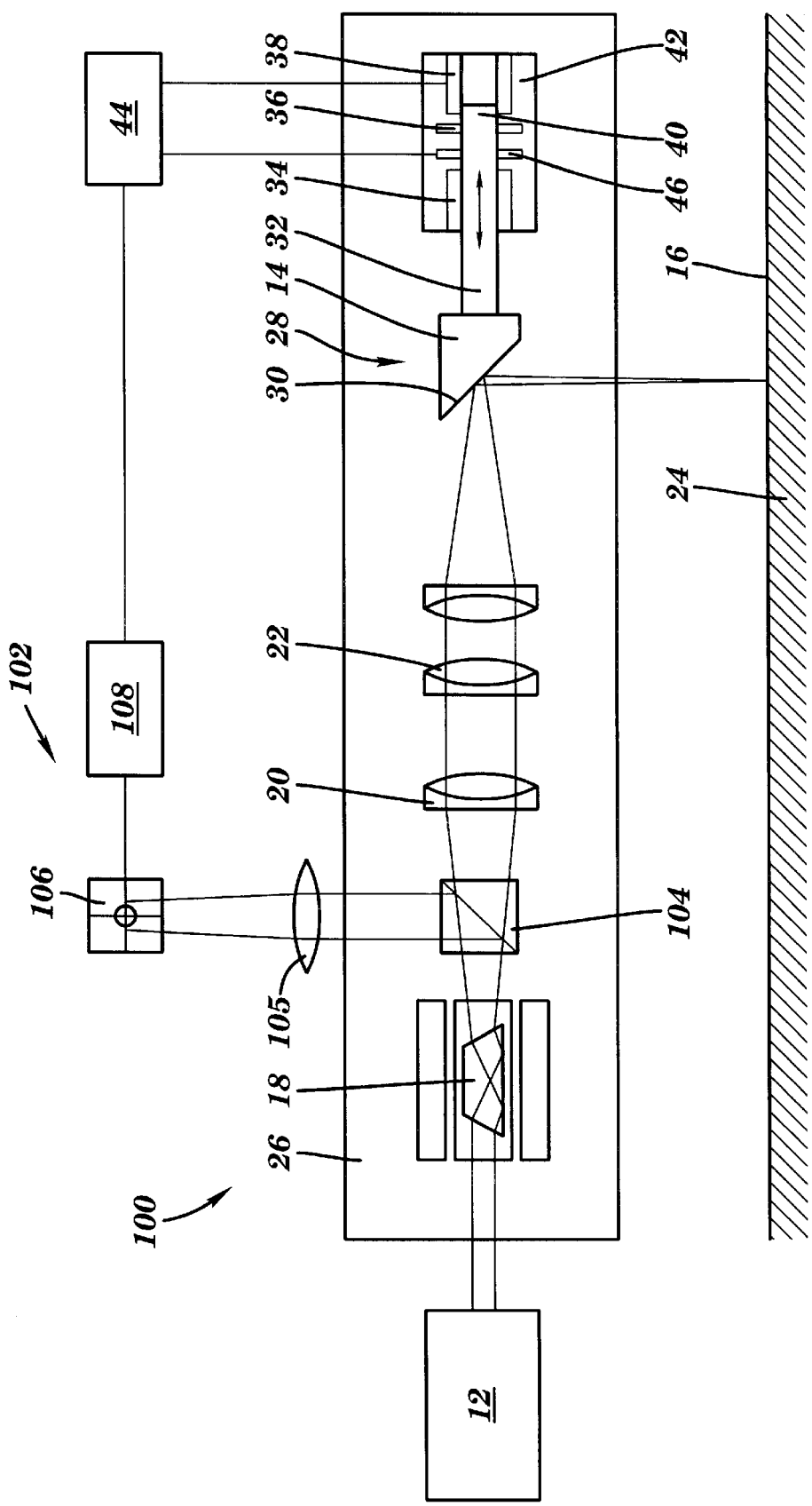
FIG. 3 schematically depicts a second embodiment of a scanning system with a translating deflector according to the present invention wherein the scanning system includes a detector for continuous detection of beam positioning.

Referring now to FIG. 3, a scanning system 100 is shown which includes a detection system, denoted generally as 102, for detecting the mispositioning of a beam with respect to a reference position. A beam splitter 104, positioned between the dove prism 18 and focusing optics 22, redirects a portion of at least one of the beams. The redirected beam is focused by lens 105 onto photodetector 106, which detects any positioning error of the beam(s) incident thereon with respect to a reference position. A processor 108 interconnected with photodetector 106 processes the output signal from the photodetector and generates correction signals in accordance with the detected mispositioning. These signals are transmitted to the linear motor control means 44, which drive the translational movement of the deflector 14 to adjust the deflected paths of the beams such that any mispositioning of the beams is compensated for.

Detection of beam mispositioning may be beneficially performed off line, i.e., prior to scanning operations. Accordingly, processor 108 may comprise a memory to store data relating to mispositioning detected during a pre-scanning "sampling" period. During scanning operations, the stored data is utilized by the processor 108 to issue signals synchronized with the rotation of the dove prism 18 to the linear motor control means 44 so that the deflector is translated to cancel out the positioning errors.

Because the scanning surface 16 will not typically extend over the entire inner circumference of the cylindrical drum 24, detection of beam mispositioning can be performed during a period in which the scanning beams scan that portion of the inner circumference of the cylindrical drum 24 over which writing is not performed. Alternatively, detection could be performed prior to mounting a scanning surface 16 on the inner circumference of the cylindrical drum 24 or prior to moving the carriage assembly 26 over the scanning surface 16.

Figure 4:
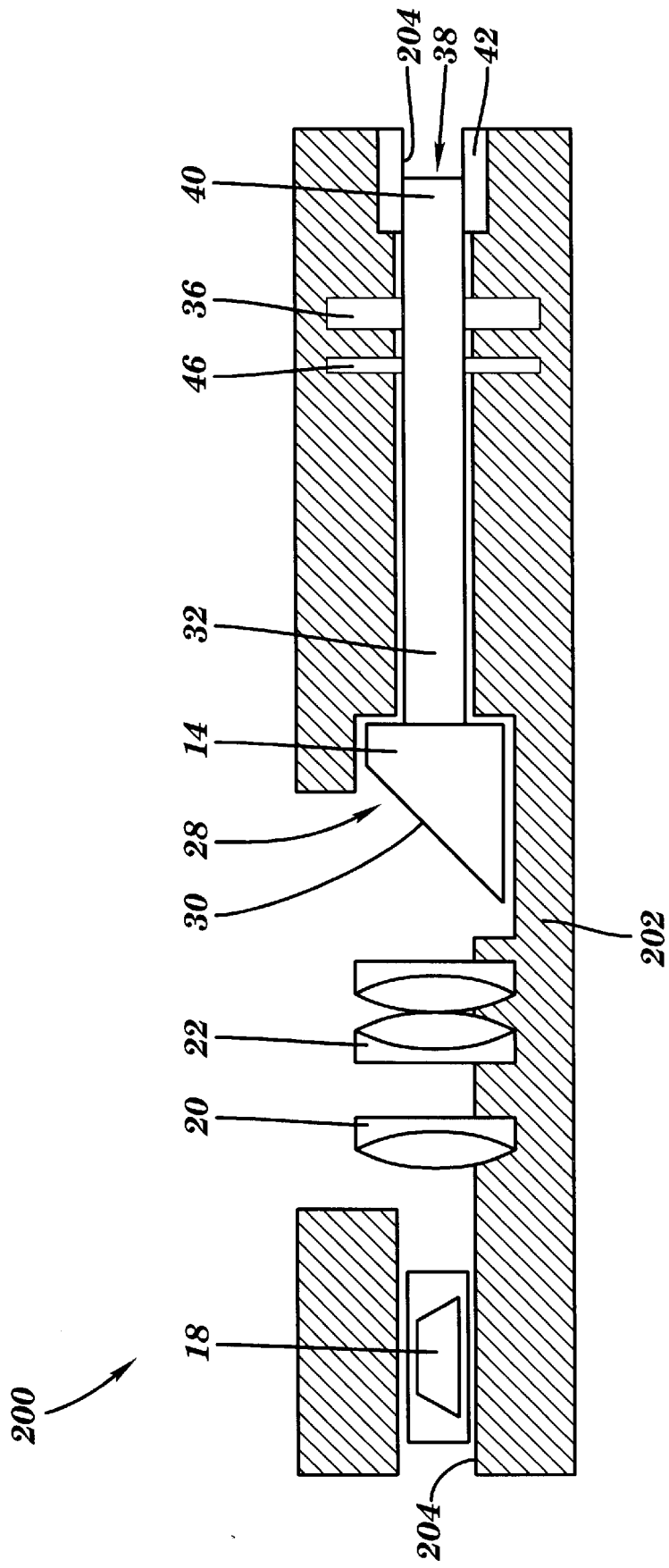
FIG. 4 schematically depicts a third embodiment of a scanning system with a translating deflector according to the present invention wherein a unitary housing is employed to minimize beam positioning errors.

FIG. 4 depicts another scanning system 200 which also utilizes a translating deflector 14 to correct for beam mispositioning. Scanning system 200 is closely similar to the scanning system 10 depicted in FIG. 1, however, in the system shown in FIG. 4, a unitary housing 202 mounts and locates the key components of scanning system 200, including dove prism 18, deflector 14, collimating optics 20 and focusing optics 22. This construction is distinguishable from prior art scanning systems which utilize separate housings for the dove prism and deflector, and which require that the separate housings be mechanically aligned. In contrast, housing 202 is adapted with a single bore 204 in which are mounted for rotation both the deflector 14 and dove prism 18, thereby insuring that the dove prism 18 and deflector 14 have substantially colinear rotation axes. In this manner, beam positioning errors arising from misalignment of the dove prism 18 and deflector 14 may be minimized. Further reduction of beam positioning error may be achieved by machining a mounting surface for the beam emitter (not shown) simultaneously with the central bore 204 which mounts the deflector 14 and dove prism 18.

While the foregoing construction will not completely eliminate beam positioning errors, it is proposed that such errors will be constrained to a range correctable by the operation of the translating deflector It will also be recognized by those skilled in the art that, while the invention has been described above in terms of preferred embodiments it is not limited thereto. Various features and aspects of the above described invention may be used individually or jointly. Further, although the invention has been described in the context of its implementation in a particular environment and for particular applications, e.g. electronic prepress applications, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

What is claimed is:

1. A scanning system comprising:
    a radiation emitter configured to emit at least one beam of radiation;
    a deflector configured to deflect said at least one beam of radiation onto a scanning surface, said deflector being rotatable about a rotation axis; and
    a device for translating said deflector along a translation axis to correct a positioning error of said at least one beam of radiation with respect to said scanning surface.

2. A scanning system according to claim 1, wherein said deflector comprises a mirror.

3. A scanning system according to claim 1, wherein said translation axis is substantially parallel to said rotation axis.

4. A scanning system according to claim 1, wherein said scanning surface comprises a curved scanning surface disposed internally of a cylindrical drum, said cylindrical drum having a central longitudinal axis substantially parallel to said rotation axis of said deflector.

5. A scanning system according to claim 1, wherein said device for translating said deflector comprises:
    a linear motor; and
    a controller in operative association with said linear motor for translating said deflector to a predetermined position along said translation axis.

6. A scanning system according to claim 5, wherein said controller operates in synchrony with rotation of said deflector.

7. A multibeam scanning system comprising:
    a radiation emitter configured to emit a plurality of beams of radiation;
    a beam rotation element for rotating said plurality of beams about a beam rotation axis;
    a deflector rotatable about a deflector rotation axis for deflecting said plurality of beams onto a scanning surface; and
    a device for linearly translating said deflector along a translation axis to correct a positioning error of said plurality of beams with respect to said scanning surface.

8. A multibeam scanning system according to claim 7, wherein said beam rotation element comprises a dove prism.

9. A multibeam scanning system according to claim 7, wherein said deflector comprises a mirror.

10. A multibeam scanning system according to claim 7, wherein said translation axis is substantially parallel to said deflector rotation axis.

11. A multibeam scanning system according to claim 7, wherein said scanning surface comprises a curved scanning surface disposed internally of a cylindrical drum, said cylindrical drum having a central longitudinal axis generally parallel to said deflector rotation axis of said deflector.

12. A multibeam scanning system according to claim 7, wherein said means for translating said deflector comprises:
    a linear motor; and
    a controller in operative association with said linear motor for translating said deflector to a predetermined position along said translation axis.

13. A multibeam scanning system according to claim 12, wherein said controller operates in synchrony with rotation of said beam rotation element.

14. A multibeam scanning system according to claim 7, wherein said deflector and said beam rotation element are mounted within a unitary housing.

15. A method of scanning a scanning surface, comprising the steps of:

emitting at least one beam of radiation;

deflecting said at least one beam of radiation from a deflector to form at least one scan line on said scanning surface, said deflector being rotatable about a rotation axis;

translating said deflector along a translation axis substantially parallel to said rotation axis during the scanning of said scanning surface to correct for a misalignment of said at least one beam of radiation with respect to said scanning surface.

16. A method for correcting a periodic beam positioning error in a scanning system, said scanning system having means for emitting at least one beam of radiation directed towards a deflector configured to deflect said at least one beam onto a scanning surface, said method comprising the steps of:

obtaining beam positioning error data characterizing a positioning error of said at least one beam of radiation with respect to said scanning surface;

storing said beam positioning error data in a storage medium;

providing a device for translating said deflector along a translation axis; and driving said translation device during scanning operations in accordance with said beam positioning error data to correct said positioning error of said at least one beam of radiation.

17. An error-correcting deflector for a scanning system, comprising:

a deflector rotatable about a rotation axis, said deflector being configured to deflect at least one beam of radiation onto a scanning surface, said at least one beam of radiation having an incident path and a deflected path with respect to said deflector; and a device for translating said deflector along a translation axis substantially parallel to said rotation axis, whereby said deflected path of said at least one beam of radiation is adjusted to correct a positioning error of said at least one beam of radiation with respect to said scanning surface.

18. An error-correcting deflector according to claim 17 wherein said deflector comprises a mirror.

19. An error-correcting deflector according to claim 17 wherein said device for translating comprises a linear motor configured to move said deflector along said translation axis.

20. An error-correcting deflector according to claim 19 further comprising:

a device for characterizing a position error of said at least one beam of radiation; and, a driver in operative association with said device for characterizing the position error, said driver for translating said deflector along said translation axis in a manner which corrects said position error.

21. An error-correcting deflector according to claim 20 wherein said device for characterizing said position error measures the position error at said incident path.

22. An error-correcting deflector according to claim 17 further comprising a controller in operative association with said linear motor for translating said deflector.

* * * * *